United States Patent [19]

Miyawaki

[11] 4,423,553
[45] Jan. 3, 1984

[54] BLADE FOR A SAW AND A METHOD FOR MANUFACTURING THE SAME

[76] Inventor: Uichi Miyawaki, 1015-1 Kishi-cho, Ono-shi, Hyogo Pref., Japan

[21] Appl. No.: 332,455

[22] Filed: Dec. 21, 1981

[30] Foreign Application Priority Data

May 1, 1981 [JP] Japan .................................. 56-67448

[51] Int. Cl.³ ........................ B27B 21/00; B23D 63/00
[52] U.S. Cl. ........................................ 30/355; 83/848; 76/112; 145/31 R
[58] Field of Search ............................ 30/166 R, 355; 145/31 R, 31 B, 31 AB, 31 AG; 83/848, 849, 850, 851, 852; 76/112

[56] References Cited

U.S. PATENT DOCUMENTS

| | | | |
|---|---|---|---|
| 542,420 | 7/1895 | Morris | 83/850 |
| 810,530 | 1/1906 | Guedel | 83/848 |
| 2,194,785 | 3/1940 | Brubaker | 83/849 |
| 3,032,084 | 5/1962 | Traben | 83/851 X |
| 3,491,623 | 1/1970 | Sage | 76/112 X |

Primary Examiner—Jimmy C. Peters

[57] ABSTRACT

Disclosed is a blade for a cross-cutting saw that includes a plurality of alternately splayed cutting teeth wherein a certain number of said cutting teeth disposed at various points along the length of the blade are splayed with an angle less than that of the main cutting teeth, such that the less splayed intermediate cutting teeth cut away the ridge that is formed laterally between the main cutting teeth, to cut a kerf with a substantially flat bottom that does not unduly resist the action of the saw. Also disclosed is a method of manufacturing the blade of the present invention by splaying alternately all the teeth by a substantially uniform angle to the central plane of the blade, machining the edges of the teeth to provide a suitable cutting edge, and then pushing back the teeth designated as intermediate auxiliary cutting teeth so that they are splayed by a smaller angle than the remaining main cutting teeth.

6 Claims, 5 Drawing Figures

BLADE FOR A SAW AND A METHOD FOR MANUFACTURING THE SAME

BACKGROUND OF THE INVENTION

1. Field of the Invention

This invention relates to the blades used in saws, and in particular to blades for cross-cutting saws provided with alternately splayed cutting teeth, and to a method of manufacturing the same.

2. Description of the Prior Art

Saws exist in various formats for various applications. Among wood saws there are saws specifically for cross-cutting, or cutting across the grain of the wood, and ripping saws for cutting along the grain, the types of saws differing in terms of the size, shape and set of the teeth. This invention is concerned primarily with cross-cutting saws, the saws used for cutting across the wood grain, wherein the teeth along the edge of the blade are splayed at a certain angle in alternating directions away from the plane of the saw blade, and each of the cutting teeth has its edge surface machined to a taper so that the edge surface lies at an acute angle to the outer side surface of the tooth. The width of the kerf or cut made with such a saw is substantially determined by the distance between the outer edge tips of the cutting teeth. However, when a blade of this kind produces a kerf, a central longitudinal projecting ridge is left centrally along the bottom of the kerf in the area between the tips of the splayed teeth. This ridge produces friction against the non-cutting inside edge of the teeth, obstructing and slowing the action of the blade, requiring additional effort for the same cutting performance. That is to say, the action of the saw is rendered heavy and inefficient.

Heretofore it has been known to provide circular saws using alternately splayed teeth as above described, with intermediate auxiliary raker teeth disposed at intervals of a certain number of normal main cutting teeth around the periphery of the blade. However, these raker teeth do not have tapered cutting edges, as they are not cutting teeth, the principle behind their provision being to push any sawdust out of the way of the cutting teeth, and not to overcome the aforementioned defects inherent with splayed teeth blades. The tip edges of these raker teeth, being untapered, were parallel to the workpiece as in a ripping or vertical cutting saw, and so saws provided with such teeth are even heavier in action and less efficient, as the raker teeth drag on the central ridge without effectively cutting it at all, much in the way a ripping saw would perform in a cross-cutting application.

Furthermore, in the process of manufacturing the aforementioned prior saw blades with splayed cutting teeth and intermediate auxiliary raker teeth, the operation of setting the angles of the teeth required that the individual teeth be differentiated to exclude the raker teeth from machining. Thus it was impossible or extremely difficult to employ automated or mechanical machining.

SUMMARY OF THE INVENTION

Accordingly it is an object of the present invention to provide a blade for a cross-cutting saw which eliminates the above described drawbacks of the prior art saw blades, as well as a method for manufacturing the same.

This and other objects of the present invention are achieved by providing a blade for a cross-cutting saw that includes a plurality of alternately splayed cutting teeth wherein a certain number of said cutting teeth disposed at various points along the length of the blade are splayed with an angle less than that of the main cutting teeth such that the less splayed intermediate cutting teeth cut away the ridge that is formed laterally between the splayed main cutting teeth to cut a kerf with a substantially flat bottom that provides minimum resistance to the action of the saw.

Such a blade can be manufactured according to this invention by alternately splaying all the teeth along the edge of the saw blade by a substantially uniform angle, machining the edges of all the teeth to provide suitable cutting edges, and then pushing back by a predetermined amount the teeth that have been designated as intermediate cutting teeth, so that the intermediate cutting teeth are left splayed by a suitable angle smaller than that of the main cutting teeth.

BRIEF DESCRIPTION OF THE DRAWINGS

Other objects and advantages of this invention will become apparent from the following description taken in conjunction with the accompanying drawings wherein are set forth by way of illustration and example certain embodiments of this invention.

DETAILED DESCRIPTION OF THE PREFERRED EMBODIMENTS

Figure 1:
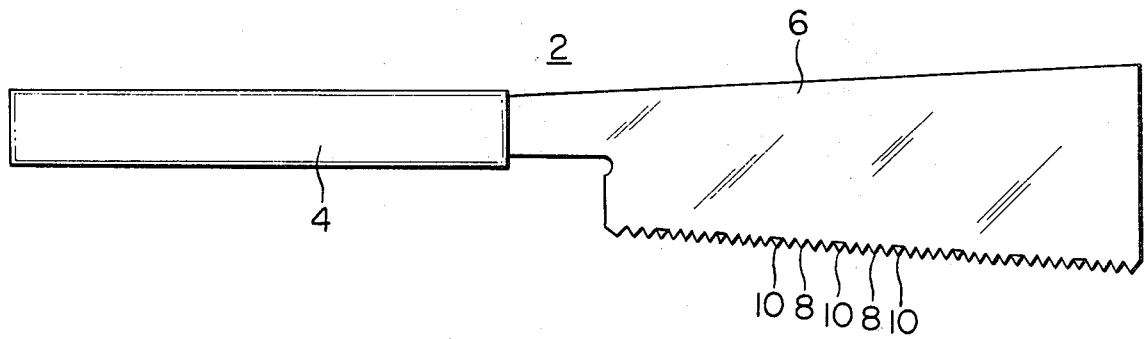
FIG. 1 is a side elevational view of a hand saw fitted with a sawblade according to the present invention.
Figure 2:
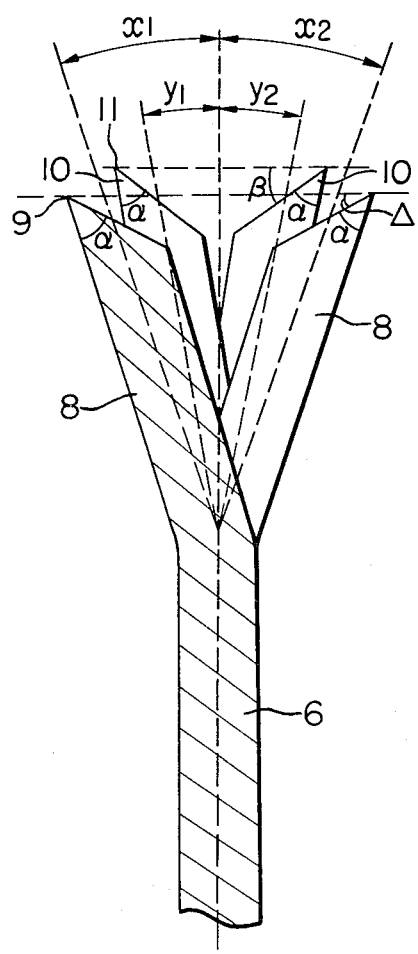
FIG. 2 is a cross sectional view of the teeth portion of a saw blade according to the present invention, as viewed from the line II—II in FIG. 3.
Figure 3:
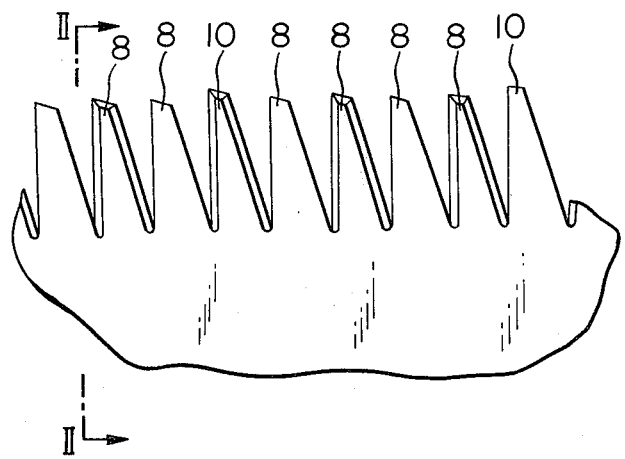
FIG. 3 is a side elevational view of a portion of a saw blade according to an embodiment of the present invention.
Figure 4:
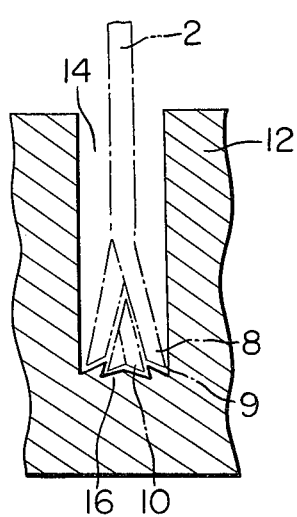
FIG. 4 is a cross-sectional view of a portion of a workpiece being cut by a saw with a blade according to an embodiment of the present invention.

FIG. 1 shows an ordinary hand saw 2 for cross-cutting applications where the cut is made across the grain, incorporating a blade 6 according to an embodiment of this invention. A handle 4 supports the blade 6, along the lower edge of which are provided a plurality of alternately splayed main and auxiliary cutting teeth 8 and 10, the main cutting teeth 8, constituting a majority of the cutting teeth on the blade, being splayed at a desired angle $x_1$ or $x_2$ to alternate sides of a plane central of the saw blade 6, as shown in section in FIG. 2, and the auxiliary cutting teeth 10 disposed individually at regular intervals, spaced apart by four main teeth in this embodiment, along the length of the cutting edge of the blade 6, being splayed with a desired angle $y_1$ or $y_2$, less than the angle $x_1$ or $x_2$ of the main cutting teeth, to alternate sides of the plane of the saw blade 6, as shown in FIG. 2. The exposed sides 9 and 11 of all the cutting teeth, both main and auxiliary 8 and 10, as shown in FIG. 3, are tapered to a sharp edge such that the edge surfaces of the teeth lie at an acute angle $\alpha$ to the outer side surface of the teeth as shown in FIG. 2. This taper makes the outer edge of the teeth 8 and 10 sharp, thus enabling them to easily, effectively, and efficiently cut the workpiece. The taper angle $\alpha$ is substantially the same for all the cutting teeth, main and auxiliary. The angle $\beta$ between the tips 11 of the auxiliary teeth and the horizontal, however, is greater than the similar angle $\Delta$ between the tips 9 of the main cutting teeth 8 and the horizontal. Geometrically the various angles can be shown to bear the following relationship: $x_1+\alpha+\Delta \approx 90°$, $x_2+\alpha+\Delta \approx 90°$, $y_1+\alpha+\beta \approx 90°$, and $y_2+\alpha+\beta \approx 90°$. In use, as shown in FIG. 4, the main cutting teeth 8 cut into the workpiece 12, with the tips 9 thereof defining the width of the kerf 14, and the auxiliary teeth 10 cut in the central area laterally between the splayed main teeth 8, cutting away at that area to produce a substantially flat bottom 16 to the kerf 14. Thus in effect there are four rows of teeth cutting away at the workpiece, cutting and clearing away any resistance to the motion of the blade 6, thus enabling the saw 2 to be operated with less force or effort than was required to achieve the same cutting rate with a prior saw.

In order to ascertain the advantages of the saw blade according to the present invention, the following unillustrated experiment was carried out. Two 240 mm long saw blades with a metal thickness of 0.7 mm were prepared, each with substantially identically shaped and tapered cutting teeth, with a pitch of 17 teeth per 30 mm. On one blade, all the teeth were alternately splayed by an equal amount, with the tips of the teeth extending 0.2 mm from the plane of the adjacent surface of the blade, according to the prior art. On the other blade all the teeth were splayed in the same way, but then every fifth and sixth tooth, i.e. adjacent pairs separated by four main cutting teeth, was pushed back to the vertical such that they were not splayed at all, i.e. the splay angle was zero, in accordance with the present invention. These two saws were then rigged up on a mechanical test apparatus such that they were each caused to cut a block of wood of substantially square section with 48 mm sides, with an equal 23 strokes being carried out in the space of 20 seconds. Each stroke was 210 mm long.

The relative effectiveness of the two saws was then assessed by measuring the sectional area of the cut produced. From this it was found that the saw according to an embodiment of the present invention provided a substantial improvement in effective cutting performance of between 21% and 73% over the cutting performance of the conventional saw. Variations were noted in repetitions of the test, with the improvement recorded depending on the nature of the wood, i.e. its hardness, with greater effects being achieved with the saw according to the present invention with harder woods, and the down force applied on the blade during the cutting operation. Nevertheless, whatever the given circumstances, it was proven that the saw blade according to the present invention is substantially superior to the saw blade of the prior art.

In addition to enabling the blade to cut more easily and efficiently, it has been found that the intermediate auxiliary teeth also serve to deflect and expel the sawdust that collects in the kerf, thereby further ensuring that the action of the saw is not unduly impeded.

The angle of splaying, $y_1$ or $y_2$, of the auxiliary cutting teeth is defined according to this invention as being less than the splay angle $x_1$ or $x_2$ of the main cutting teeth. Accordingly the auxiliary cutting teeth may be splayed at any intermediate angle, which may be an angle that positions the auxiliary cutting teeth approximately midway between the plane of the main teeth and the vertical central plane of the saw blade, as shown in FIG. 2. Alternatively, the splaying angle $y_1$ or $y_2$ of the auxiliary cutting teeth may approach or substantially equal 0° in relation to the vertical central plane of the sawblade 6, as shown in the embodiment illustrated in FIG. 5. The operation and effects of the sawblade according to this embodiment are substantially similar to those with the first above mentioned embodiment, and so description thereof is omitted.

Next a method for manufacturing a blade for a saw such as those above described, will be explained.

Figure 5:
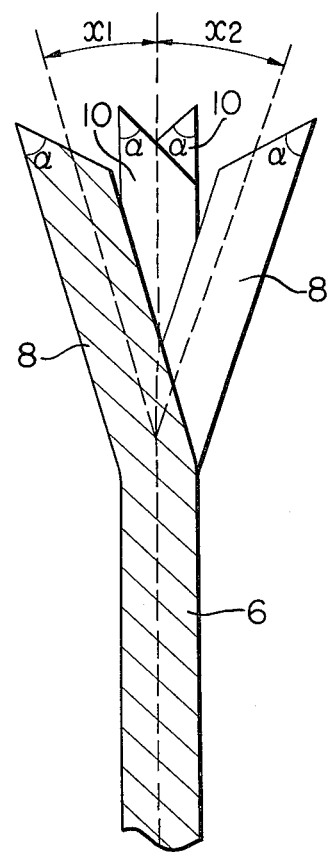
FIG. 5 is a cross-sectional view of another embodiment of the present invention, similar to the view shown in FIG. 2.

The method of manufacturing contemplated by this inventor comprises the steps of producing the basic unsharpened blade by any suitable known method, such as forging. The basic blade thus formed is then provided with a plurality of substantially identical untapered and unsplayed teeth along at least one edge thereof. In the next step of the operation, all the teeth, i.e. both the teeth which are designated to be main cutting teeth and those which are to be auxiliary cutting teeth, are alternately splayed to an angle $x_1$ or $x_2$, as shown in FIG. 2 or 5, by any suitable known automated or manual mechanical method. This method may comprise manually bending each tooth to the required position, or a suitable automated device may perform the same function. In the prior art, the intermediate auxiliary raker teeth prevented automation in this operation, but in the present invention, all the teeth are initially splayed with the same angle, albeit in alternate directions, and so the advantages of automation can easily be exploited. Subsequently, the edges of the teeth are machined to a taper such that the edge surfaces lie at a suitable acute angle to the outer side surface of the teeth. Since every tooth on a side of the central plane of the sawblade is splayed at a similar angle, and every tooth is to be similarly tapered, as with the splaying operation described above, automation is greatly facilitated over the prior art, as there is no need to discriminate and exclude from the machining operation teeth such as raker teeth, the edges of which are not to be tapered.

Once the machining operation is complete and every tooth has been provided with a sharp tapered edge, a relatively small number of designated intermediate auxiliary cutting teeth, typically at regular intervals along the length of the blade, are pushed back towards the vertical central plane of the sawblade, until they are splayed by a suitable angle smaller than the angle at which the main cutting teeth are splayed. The operation of pushing or setting the auxiliary cutting teeth to their desired splay angles may be carried out manually, or by suitably programming a suitable automatic tool.

This step completes the method of manufacturing a saw blade according to the present invention.

It goes without saying that all of the above described steps may adequately be carried out manually, but certain particular advantages of this invention lend themselves to facilitated automation, and this inventor contemplates this to be the most efficient mode of manufacture.

It is to be understood that although only certain preferred embodiments of the present invention have been illustrated and described, various changes may be made in the form, details, arrangement and proportion of the parts of the saw blade itself, as well as the saws consisting thereof, and therefore the blades may be applicable to various machines other than those as exemplified above in various forms, without departing from the scope of the invention which consists of the matter shown and described herein and set forth in the appended claims.

What is claimed is:

1. A blade for a cross-cutting saw provided along at least one edge thereof with a plurality of cutting teeth splayed in alternate directions, each cutting tooth edge being tapered to a sharp cutting edge on its outer edge, forming an acute taper angle a which is substantially the same for all cutting teeth, each cutting tooth being inclined at an angle to the central plane of the blade and each adjacent tooth being inclined at an angle to the same plane but in the opposite direction and each cutting tooth being equally spaced along the length of the blade from each adjacent tooth, wherein main cutting teeth comprising a majority of said cutting teeth along said edge of said blade are splayed with a desired splaying angle x to said central plane of the blade such that the width between the outer tips of the splayed main cutting teeth defines a width of a kerf cut in a workpiece when said saw is used to cut the workpiece and such that said main cutting teeth form an angle $\Delta$ with the horizontal, and a predetermined number of intermediate auxiliary cutting teeth at a plurality of predetermined points along said edge of said blade comprising the balance of said cutting teeth other than said main cutting teeth, are splayed with a desired splaying angle y which is less than the splaying angle of said main cutting teeth, such that said auxiliary teeth cut in the area laterally between said main cutting teeth and such that said auxiliary cutting teeth form an angle B with the horizontal, the angles bearing the following relationships: $x+a+\Delta=90°$ and $y+a+B=90°$, said auxiliary cutting teeth extending further along the central plane of the blade than said main cutting teeth, and the combined cutting action of said main and said auxiliary cutting teeth creates a substantially flat-bottomed kerf in the workpiece when said saw is used to cut said workpiece.

2. A blade for a cross-cutting saw as claimed in claim 1 wherein said intermediate auxiliary cutting teeth are splayed with a splaying angle such that they lie substantially midway between said splaying angle of said main cutting teeth and said central plane of said sawblade.

3. A blade for a cross-cutting saw as claimed in claim 1 wherein said splaying angle of said intermediate auxiliary cutting teeth is substantially zero degrees from said central plane of said sawblade.

4. A blade for a cross-cutting saw as claimed in any one of claims 1 to 3 wherein said intermediate auxiliary cutting teeth are positioned singly at various points along the length of said blade, said points being spaced apart by a constant even number of main cutting teeth.

5. A blade for a cross-cutting saw as claimed in any one of claims 1 to 3 wherein said intermediate auxiliary teeth are positioned in pairs at various points along the length of said blade, said points being spaced apart by a constant even number of main cutting teeth.

6. A method of manufacturing a blade for a cross-cutting saw, comprising the steps of:
   producing a basic blade with a plurality of unsplayed, untapered teeth along at least one edge thereof;
   alternatively splaying the teeth so that each tooth is inclined at a suitable angle to the central plane of the blade and each adjacent tooth is inclined at a similar angle to the same plane but in the opposite direction;
   machining a tapered cutting edge to each tooth along the edge of the blade such that the outer edge of each tooth becomes a cutting edge; and
   returning a predetermined number of said teeth at a plurality of predetermined points along the edge of said blade, towards the central plane of the blade such that said predetermined number of said teeth are splayed with an angle less than the splaying angle of the remaining majority of said teeth.

* * * * *